(12) United States Patent
Gardner et al.

(10) Patent No.: US 6,446,251 B1
(45) Date of Patent: Sep. 3, 2002

(54) METHOD AND APPARATUS FOR SOCKET-BASED DESIGN WITH REUSABLE-IP

(76) Inventors: David Neal Gardner, 2128 Woodston Dr., Round Rock, TX (US) 78664; Robert E. Garner, 3456 Mulberry Creek Dr., Austin, TX (US) 78732

( * ) Notice: Subject to any disclaimer, the term of this patent is extended or adjusted under 35 U.S.C. 154(b) by 0 days.

(21) Appl. No.: 09/540,784

(22) Filed: Mar. 31, 2000

Related U.S. Application Data

(60) Provisional application No. 60/139,146, filed on Jun. 14, 1999.

(51) Int. Cl.[7] .............................................. G06F 17/50
(52) U.S. Cl. ............................................ 716/18; 716/7
(58) Field of Search ........................... 716/1–21; 714/1, 714/25, 27, 28, 30, 100, 699, 724, 726, 729, 736; 703/13, 14, 23

(56) References Cited

U.S. PATENT DOCUMENTS 6,269,467 B1 * 7/2001 Chang et al. .................. 716/1

* cited by examiner

Primary Examiner—Vuthe Siek
Assistant Examiner—Naum B Levin
(74) Attorney, Agent, or Firm—Blakely Sokoloff Taylor & Zafman, LLP

(57) ABSTRACT

A method and apparatus for socket-based design with reusable intellectual property (IP) includes a chip integration system (CIS) that provides designers with a convenient method to create and describe a system on a chip (SOC) design independent of design flow. A Chip Integration Description Language (CIDL) is also disclosed that provides a mechanism for defining interfaces between IP cores in a way that isolates a system designer from much of the connection information previously required is also disclosed. Using CIDL, a system designer is able to rapidly connect multiple blocks of intellectual property (IP) based upon the functionality of the blocks rather than traditional hardware-specific connection methods. The details pertaining to specific connections that may be needed are encapsulated within a CIDL-based file that is typically written by the IP core designer. The actual connection of signals between blocks of IP, however, is performed by a CIDL compiler that uses the CIDL file(s) as input.

18 Claims, 7 Drawing Sheets

```
core int_ctlr {
    terminal addr {}
    terminal data {}                    ⎫
    terminal rd   {}                    ⎬ 402
    terminal wr   {}                    ⎪
    terminal cs   {}                    ⎭
    terminal level1 { default = "0"; }  ⎫
    terminal level2 { default = "0"; }  ⎬ 404
    terminal level3 { default = "0"; }  ⎪
    terminal level4 { default = "0"; }  ⎭
    required socket mybus of custombus {
        connections {
            address => addr,
            data    => data,
            read    => rd,
            write   => wr,
            select  => cs
        }
        signature {
            base_address = "unset" ;
        }
    }
    required socket int1 of interrupt {
        connections { int => level1 }
        signature  { priority = "1" ; }
    }
    required socket int2 of interrupt {
        connections { int => level2 }
        signature  { priority = "2" ; }
    }
    required socket int3 of interrupt {
        connections { int => level3 }
        signature  { priority = "3" ; }
    }
    required socket int4 of interrupt {
        connections { int => level4 }
        signature  { priority = "4" ; }
    }
```

400

410 — mybus socket block

412 — int1 socket block
414 — int2 socket block
416 — int3 socket block
418 — int4 socket block

FIG. 4

```
core watchdog {
        terminal addr  {}
        terminal      data {}
        terminal rd  {}                    } 610
        terminal wr  {}
        terminal cs  {}
        terminal alarm  {}
        required socket mybus of custombus {
           connections {
                address => addr,
                data    => data,
                read    => rd,
                write   => wr,
                select  => cs
           }
           signature {
                base_address = "unset" ;
           }
        }
        optional socket alarmint of interrupt {
           connections { int => alarm }
           signature { priority = "unset" ; }
        }
        optional socket alarmrst of reset {
           connections { rst => alarm }
        }
}
```

FIG. 6

METHOD AND APPARATUS FOR SOCKET-BASED DESIGN WITH REUSABLE-IP

This application claims priority to U.S. Provisional Application No. 60/139,146, filed Jun. 14, 1999, titled "Method and Apparatus for Smart Design of Reusable IP".

BACKGROUND OF THE INVENTION

1. Field of the Invention

The present invention relates to the field of electronic design automation and, in particular, to a method and apparatus for socket-based design with reusable intellectual property.

2. Background Information

In the design of a common electronic system containing multiple interconnected components, a substantial amount of detailed connection information is required when using traditional design methodologies such as schematic capture, hardware description languages and netlist formats.

In an example where a single core is connected to a system bus, the designer typically is required to be aware of a wide range of design details such as knowledge of read lines, write lines, requests & acknowledges, the width of the address and data buses, where the core needs to map into the address space, what range of addresses it needs, and so on. Once the core is defined, the designer proceeds to connect nets and buses in a one-by-one fashion and manually assigns a net name to each connection. Multiply this connection information by the number of cores interacting in a typical system and the result is a system that is difficult to create and maintain.

Thus, a need exists for a convenient method of describing a high-level system through the assembly of lower-level components while isolating the system designer from much of the connection information required by conventional methods.

SUMMARY OF THE INVENTION

In accordance with the teachings of the present invention, a method and apparatus for socket-based design with reusable-IP is presented. In particular, in accordance with one embodiment of the present invention, a first set of one or more terminals of a first core are represented as a first socket having a first signature value. A second set of one or more terminals of a second core are represented as a second socket having a second signature value. The first socket is then automatically associated with the second socket based at least in part on a relationship between the first and second signature values.

BRIEF DESCRIPTION OF DRAWINGS

The present invention will be more fully understood from the detailed description given below and from the accompanying drawings of various embodiments of the invention, which, however, should not be taken to limit the invention to the specific embodiments, but are for explanation and understanding only.

FIG. 4 illustrates one embodiment of a ClDL-based definition for the interrupt controller core of FIG. 3.

FIG. 6 illustrates one embodiment of a CIDL watchdog core definition.

DETAILED DESCRIPTION OF THE INVENTION

Figure 1:
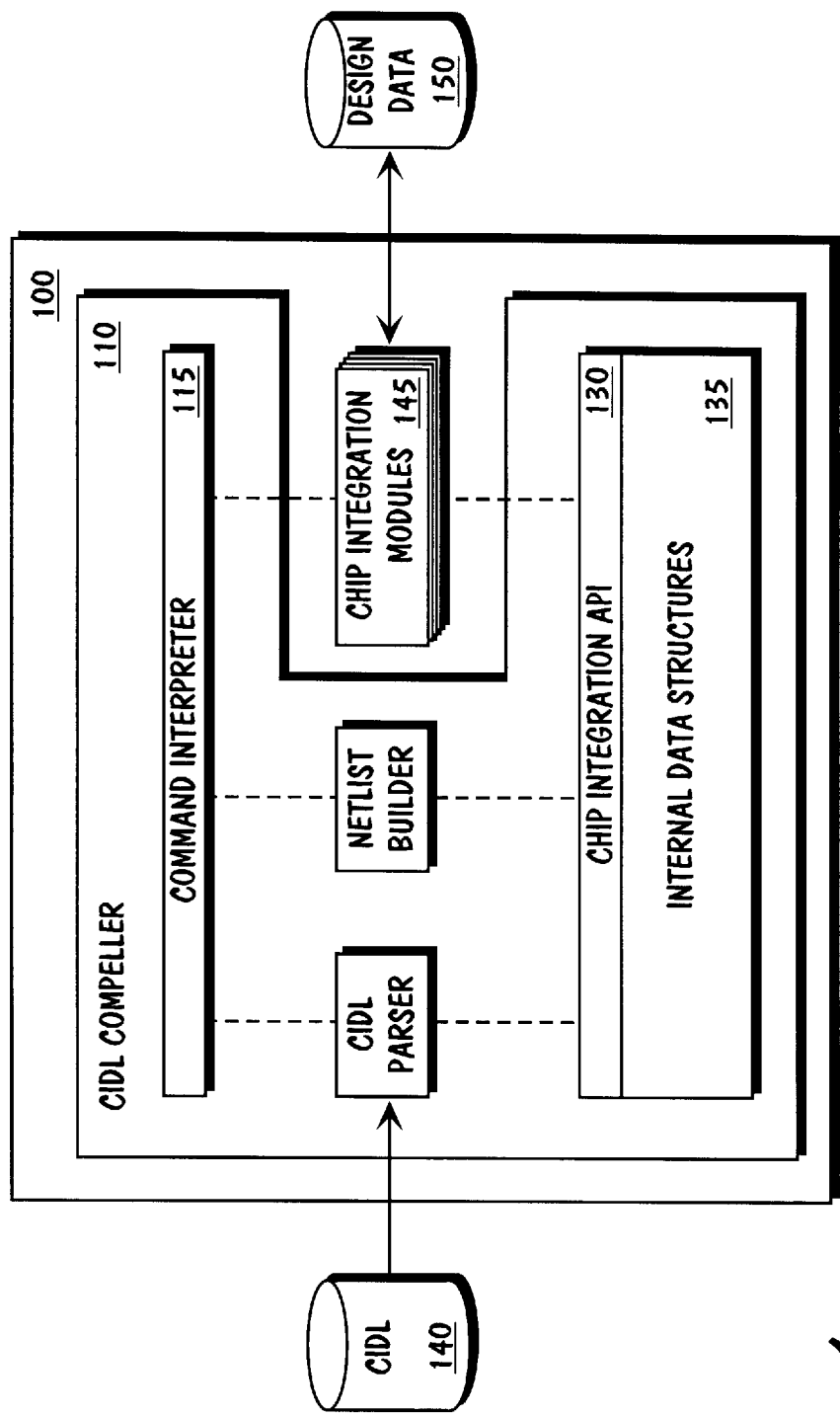
FIG. 1 illustrates one embodiment of a Chip Integration System (CIS) including a Chip Integration Description Language (CIDL) compiler.

In the following description, various aspects of the present invention will be described, and various details will be set forth in order to provide a thorough understanding of the present invention. However, it will be apparent to those skilled in the art that the present invention may be practiced with only some or all aspects of the present invention, and the present invention may be practiced without the specific details. In other instances, well known features are omitted or simplified in order not to obscure the present invention.

Parts of the description will be presented using terminology commonly employed by those skilled in the art to convey the substance of their work to others skilled in the art, such as intellectual property, core, netlist, tool, and so forth. Also, parts of the description will also be presented in terms of operations performed by a computer system, using terms such as determining, analyzing, associating, mapping, and the like. As is well understood by those skilled in the art, these quantities or operations take the form of electrical, magnetic, or optical signals being stored, transferred, combined, and otherwise manipulated through electrical, magnetic and optical components of a digital system; and the term digital system includes general purpose as well as special purpose data processing machines, systems, and the like, that are standalone, adjunct or embedded.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

A method and apparatus for socket-based design with reusable intellectual property (IP) is disclosed. More specifically, a chip integration system (CIS) is described herein that provides designers with a convenient method to create and describe a system on a chip (SOC) design in a method that is independent of design flow. In one embodiment, the CIS uses a Chip Integration Description Language (CIDL) to capture SOC designs in a tool-independent manner. CIDL provides a mechanism for defining interfaces between IP cores in a way that isolates a system designer from much of the connection information previously required according to the prior art. Using CIDL, a system designer is able to rapidly connect multiple blocks of intellectual property (IP) based upon the functionality of the blocks rather than traditional hardware-specific connection methods. The details pertaining to specific connections that may be needed are encapsulated within a CIDL-based file that is typically written by the IP core designer. The actual connection of signals between blocks of IP, however, is performed by a CIDL compiler that uses the CIDL file(s)

as input. In one embodiment, the CIS dynamically creates and/or modifies IP based upon system design requirements.

FIG. 1 illustrates one embodiment of a CIS. CIS 100 includes CIDL compiler 110, command interpreter 115, parser 120, netlist builder 125, chip integration application programming interface (API) 130, internal data structures 135, and chip integration modules 145. Additionally shown in FIG. 1 are CIDL file 140, and design data file 150.

CIDL file 140 is the main input file for CIS 100 and it contains all the information required to build a system. Except for the teachings of the present invention, CIDL compiler 110 is intended to represent a broad range of compilers known in the art. As CIDL file 140 is read by CIDL compiler 110, CIDL compiler 110 parses CIDL file 140 and stores the parsed data within internal data structures 135.

Command interpreter 115 is a command line interface that interprets and executes individual commands entered by a user with respect to CIDL compiler 110. In an alternative embodiment, commands may be edited into an ASCII file which can be specified through a command line switch when CIDL compiler 110 is invoked. Additionally, chip integration modules 145, netlist builder 125, and parser 120 all have access to both command interpreter 115 and chip integration API 130.

Netlist builder 125 represents a plurality of instructions, that when executed, create a generic netlist within internal data structures 135. Chip integration modules 145 represent one or more software-based routines that can be used to expand the functionality of CIDL compiler 110. For example, by using one or more chip integration modules 145, internal data structures 135 can be queried and/or modified. In one embodiment, the generic netlist created by netlist builder 125 can be accessed by chip integration modules 145, which may in turn convert the generic netlist into a tool-dependent specification. In one embodiment, chip integration modules 145 convert the generic netlist into a top-level Verilog specification including a top module declaration, a pin list, and instantiations of all the IP used in the design.

In some cases, when a system is constructed from cores, there is logic that will change depending on the specific cores utilized by the system designer. Accordingly, chip integration modules 145, can automatically create and/or modify such cores based on the implemented system design. For example, address decode logic may be required to decode various chip selects at different locations in a given address space depending upon the specific cores utilized within the system and the system designer's particular wishes. In such a case, the chip integration modules 145 can manipulate the internal data structures 135 of the CIS 100, by extracting functional information contained in the CIDL, to add or modify a core as required. In one embodiment, chip integration modules 145 can additionally output a design file containing the logic for the core. In one embodiment, chip integration modules 145 are implemented using the Perl scripting language, while in another embodiment, chip integration modules 145 are implemented using the C++ programming language. It will be apparent to one skilled in the art, however, that various other programming and/or scripting languages known in the art may likewise be utilized to implement chip integration modules 145 without departing from the spirit and scope of the present invention.

Figure 2:
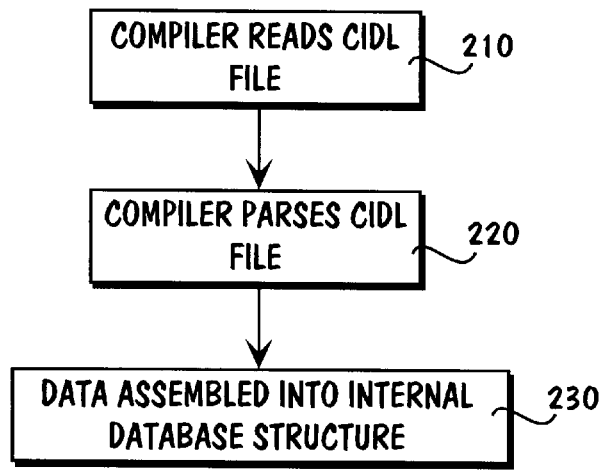
FIG. 2 illustrates one embodiment of the operational flow of the CIS of FIG. 1.

FIG. 2 illustrates one embodiment of the operational flow of the chip integration system shown in FIG. 1. Referring to FIG. 2 with reference to FIG. 1, CIDL file 140 is input into CIDL compiler 110 at processing block 210. As CIDL compiler 110 reads CIDL file 140, it parses CIDL file 140 at processing block 220, and stores the parsed data within internal data structures 135 at processing block 230. Once CIDL file 140 has been parsed and the resulting data stored within internal data structures 135, the data is accessible to chip integration modules 145 by way of calls to chip integration API 130.

Interfaces

The Chip Integration Description Language provides a convenient method for describing a high-level system through the assembly of lower-level components. One mechanism defined within CIDL that encapsulates the information needed to describe interactions between IP cores is called an interface. In one embodiment, interfaces contain specific connector information and functional parameter data that when interpreted by a compiler, allow connections between cores to be described in functional terms. Interfaces may represent various connections typically made within a given design reuse system including, without limitation, bus, interrupt, and reset connections for example. Additionally, many different interfaces may simultaneously exist within a given design reuse system.

The following CIDL code illustrates an exemplary embodiment of an interrupt interface:

EXAMPLE 1

```
interface interrupt {
    connectors  { int }
    signature   { priority = "unset"; }
}
```

The code representing the interrupt interface shown above in Example 1, contains one connection "int" and one functional or signature parameter "priority". A signature parameter, as described herein, represents some functional aspect of the interface to which it is related. Examples of signature parameters include, for example, an interrupt priority level within an interrupt interface and a base address or address range specification within a bus interface. Although the exemplary interrupt interface shown above contains one signature parameter "priority", any number of signature parameters or no signature parameters may be included within the interface definition. Likewise, although the interrupt interface shows only one connector "int", more than one connector may be used.

The following CIDL code illustrates an exemplary embodiment of a bus interface named "custombus":

EXAMPLE 2

```
interface custombus {
    connectors  { data, address, read, write, select }
    signature   { base_address = "unset"; }
}
```

The custombus interface shown in Example 2 above, contains multiple connectors including a data connector, an address connector, a read connector, a write connector, and a chip select connector. The custombus interface also contains a signature parameter named "base_address" which has an indeterminate value indicated by the term "unset."

Cores & Sockets

In CIDL, a core is the basic building block used to create integrated circuit (IC) and SOC designs. In an exemplary design flow, an IP designer will typically design each IP core to include all necessary connection information specific to that core. In an effort to create a design reuse system, the system designer will subsequently combine multiple pre-designed cores based upon the individual or combined functionality of the cores.

When a core is defined within CIDL, specific implementations of an interface, referred to as 'sockets', are specified within the core definition. Together, interfaces and sockets provide a method of abstracting connections of a netlist by allowing a user to create netlist connections based upon parameters that describe the functionality of the connections. Sockets are derived from interfaces and may be thought of as a 'view' of an interface. As such, within CIDL, socket definitions appear similar in form to interface definitions.

As with interfaces, sockets may also be defined by connections and signature parameters. Socket connections map terminals of a core to a common socket connector name, whereas socket signature parameters contain data describing the functionality of the socket. In one embodiment, socket connections specified within a CIDL file inform the CIDL compiler how to make a connection in a netlist, whereas socket signature parameters inform the CIDL compiler when to make a connection in the netlist. Furthermore, in CIDL, a socket may be designated within a core definition as being either required or optional. In one embodiment, if a socket is designated as required within a particular core definition, the socket will exist on every instance of that core. On the other hand, if a socket is designated as optional within a particular core definition, the socket will only exist for a given instance of that core if the socket is explicitly referenced within the instance definition.

Figure 3:
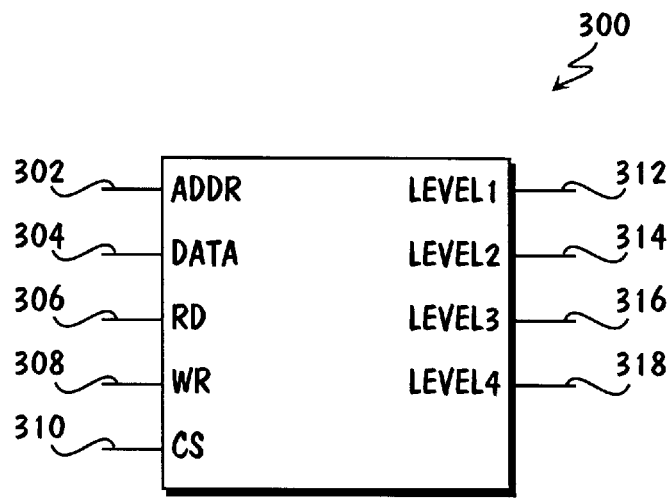
FIG. 3 illustrates one embodiment of an interrupt controller core shown without socket connections.

FIG. 3 illustrates one embodiment of an interrupt controller core shown without socket connections. Referring to FIG. 3, interrupt controller 300 is shown having address terminal 302, data terminal 304, read terminal 306, write terminal 308, and chip select terminal 310. Additionally, four interrupt level terminals are shown including level1 terminal 312, level2 terminal 314, level3 terminal 316, and level4 terminal 318. It should be apparent to one of ordinary skill in the art that the specific number and functionality of core terminals shown in FIG. 3 may vary without parting from the spirit and scope of the invention.

Part of a core definition for the interrupt controller depicted in FIG. 3 is illustrated by the following CIDL code:

EXAMPLE 3

```
core int_ctlr {
    terminal level1 { default = "0"; }
    required socket int1 of interrupt {
        connections    { int => level1 }
        signature      { priority = "1"; }
    }
}
```

In the CIDL code shown above in Example 3, the interrupt controller core definition "int_ctlr" includes a single socket "int1" of the interface "interrupt" having a single connection "int" that is mapped to a single terminal "level1" on the interrupt core.

The statement "terminal level1" is used to indicate to the compiler that the interrupt controller contains a terminal labeled "level1" as shown by reference number 312 in FIG. 3. The statement "default='0'", is an optional qualifier that allows additional information to be specified with regard to level1 terminal 312. Other terminals may contain additional qualifiers, or no qualifiers at all. In one embodiment, as shown above, the qualifier sets level terminal 312 to an initial logical low value so as to allow interrupt triggering when a signal connected to level1 terminal 312 transitions to a logical high value. Additionally, level2 terminal 314, level3 terminal 316, and level4 terminal 318 may be specified in the interrupt core definition in a manner similar to that of level1 terminal 312 in Example 3.

Referring still to Example 3, the socket definition, "required socket int1 of interrupt", creates within the interrupt controller, a socket named "int1" that represents level1 terminal 312, and is associated with the "interrupt" interface. By way of the "connections" statement, the "int" connector in the "interrupt" interface (shown in Example 1) is mapped to level1 terminal 312 represented by the "int1" socket. The statement "signature {priority ="1"; }" is used to set the "priority" of level1 terminal 312 to "1", which is used by the compiler when generating connections between cores (discussed below).

In addition to mapping individual core terminals to an interface, a socket can also map multiple core terminals to an interface. A socket definition mapping multiple core terminals to an interface is shown below:

EXAMPLE 4

```
core int_ctlr {
    terminal addr  { }
    terminal data  { }
    terminal rd    { }
    terminal wr    { }
    terminal cs    { }
    required socket mybus of custombus {
        connections {
            address    =>addr,
            data       =>data,
            read       =>rd,
            write      =>wr,
            select     =>cs
        }
        signature {base_address = "unset";}
    }
}
```

In Example 4 above, the interrupt controller core definition includes terminals "addr", "data", "rd", "wr", and "cs" shown in FIG. 3 by reference numbers 302, 304, 306, 308, and 310 respectively. The socket definition "required socket mybus of custombus" creates within the interrupt controller core, a socket named "mybus" that represents the "addr", "data", "rd", "wr", and "cs" terminals, and is associated with the "custombus" interface. The connectors in the "custombus" interface (shown in Example 2) are mapped to corresponding terminals within the interrupt controller core, represented by the "mybus" socket, by way of the "connections" statement shown in Example 4. For example, the "address" connector of the "custombus" interface is mapped to the "addr" terminal of the interrupt controller core. Similarly, the "data" connector of the "custombus" interface is mapped to the "data" terminal of the interrupt controller core.

Figure 5:
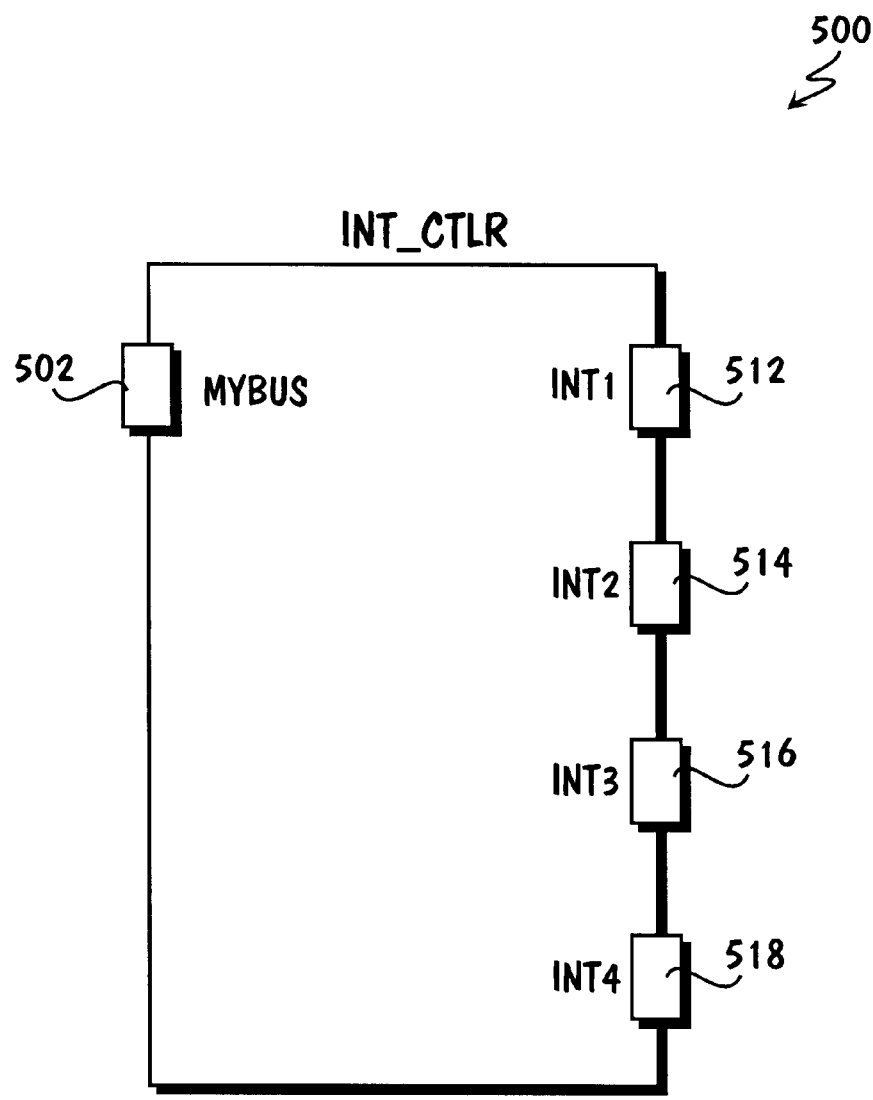
FIG. 5 illustrates one embodiment of the interrupt controller core of FIG. 3 shown with sockets replacing core terminal connections.

FIG. 4 illustrates one embodiment of a CIDL-based definition of the interrupt controller core of FIG. 3. FIG. 5 illustrates one embodiment of the interrupt controller core of FIG. 3 shown with sockets replacing core terminal connections. Referring to FIG. 4, core definition 400 represents code defining an interrupt controller core having sections 402, 404, 410, 412, 414, 416, and 418 so marked for reference. Section 402 of core definition 400 operates to establish address terminal 302, data terminal 304, read terminal 306, write terminal 308, and chip select terminal 310. Section 404 of core definition 400 operates to establish level terminal 312, level2 terminal 314, level3 terminal 316, an level4 terminal 318.

Section 410 of core definition 400 operates to represent the various core terminals established in section 402 and shown in FIG. 3, as the "mybus" socket indicated in FIG. 5 by reference number 502, and described above with respect to Example 4.

Section 412 of core definition 400 operates to represent level1 terminal 312, established in section 404 and shown in FIG. 3, as the "Int1" socket indicated in FIG. 5 by reference number 512, and described above with respect to Example 3. Additionally, sections 414, 416, and 418 of core definition 400 operate to establish the "Int2" socket, the "Int3" socket, and the "Int4" socket, indicated by reference numbers 514, 516, and 518 respectively of FIG. 5.

By representing terminals of the interrupt controller core of FIG. 3 as sockets shown in FIG. 5, the IP core designer is able to effectively isolate the system designer from the specific system design connection details. Since the connection details are 'hidden' within the core definition, all the system designer needs to be concerned with are the sockets on a given core.

IP SYSTEMS

As was stated above, an IP core is the basic building block in a reusable IP system. A system designer will combine various IP cores based upon design preferences and desired system functionality. In order to facilitate understanding of socket-based reusable IP design within a system, a second core definition is shown in FIG. 6.

FIG. 6 illustrates one embodiment of a CIDL-based watchdog core definition. Watchdog core definition 600 contains core terminal information indicated by section 610, and three sockets indicated by sections 615, 620 and 625. Section 615 defines a first socket "mybus" associated with the "custombus" interface described above with respect to Example 2. Section 620 defines a second socket "alarmint" associated with the interrupt interface described above with respect to Example 1. Within the alarmint socket definition, the interface connector "int" is mapped to a watchdog core terminal named "alarm". Section 625 defines a third socket "alarmrst" associated with an interface named "reset" containing at least one connector named "rst" that is also mapped to a watchdog core terminal named "alarm". Thus, the watchdog core definition contains multiple sockets representing the same terminal on the core.

As was stated above, a socket may be designated within a core definition as being either required or optional. Referring again to the watchdog core definition of FIG. 6, the socket "mybus" defined in section 615 is designated as required, whereas the sockets "alarmint" and "alarmrst" defined in sections 620 and 625 respectively, are designated as optional. Because "mybus" is a required socket, it will automatically be connected whenever watchdog core 600 is instantiated. Because "alarmint" and "alarmrst" are optional, however, they may or may not be used in the system when watchdog core 600 is instantiated. In one embodiment, an optional socket is used only when it is specifically referenced within a particular core instance.

An exemplary system utilizing the above described interrupt controller core and watchdog core is shown below:

EXAMPLE 5

```
system ABC {
    instance myintctlr of int_ctlr { }
    instance mywatchdog of watchdog {
        socket alarmint {
            signature { priority = "1"; }
        }
    }
}
```

The exemplary system in Example 5 above, contains a watchdog core instance and an interrupt controller core instance whereby when the system receives a watchdog alarm, a priority "1" interrupt is caused.

Since all the sockets on the int_ctlr core (shown in FIG. 4) are indicated as being required, they are automatically present within the ABC system definition, even though they are not specifically called out in the instance definition. The watchdog core (shown in FIG. 6), however, contains a required socket as well as optional sockets. The required "mybus" socket will exist in the ABC system even though it is not specifically referenced in the watchdog core instance. The "alarmint" and "alarmrst" sockets on the other hand, will not exist in the ABC system unless they are specifically called out. Example 5 (above) shows that the alarmint socket was specifically called out, whereas the alarmrst socket was not. In this example, the mywatchdog instance of the watchdog core includes the alarmint socket into the interrupt interface (as shown by section 620 of FIG. 6). Furthermore, the signature parameter "priority" for the alarmint socket has been set to a "1" which is a change from its previous state of "unset" shown in FIG. 6. As cores are instantiated within a system, signature parameter values within the cores may be set according to system design constraints.

Netlist Builder

Referring back to FIG. 1, after CIDL-based file 140 has been parsed by parser 120 and internal data structures 135 constructed, netlist builder 125 may be executed. When executed, netlist builder 125 creates a generic netlist within internal data structures 135. This information can then be used by chip integration modules 145 to create a netlist in a desired, tool-specific format.

Netlist builder 125 determines the terminals that are to be connected in the netlist, generates a unique net name for each connection, and assigns the generated net name to a built-in variable. In one embodiment of the present invention, each terminal of each instance in a system is assigned a built-in variable within which the generated net name is stored. Since connections only occur inside of interfaces, when CIDL compiler 110 begins the process of creating connections, it first creates a list of each interface in the system and then automatically processes those interfaces one by one. Within a given interface, connections are made between sockets, but only if the sockets contain identical signature values.

Figure 7A:
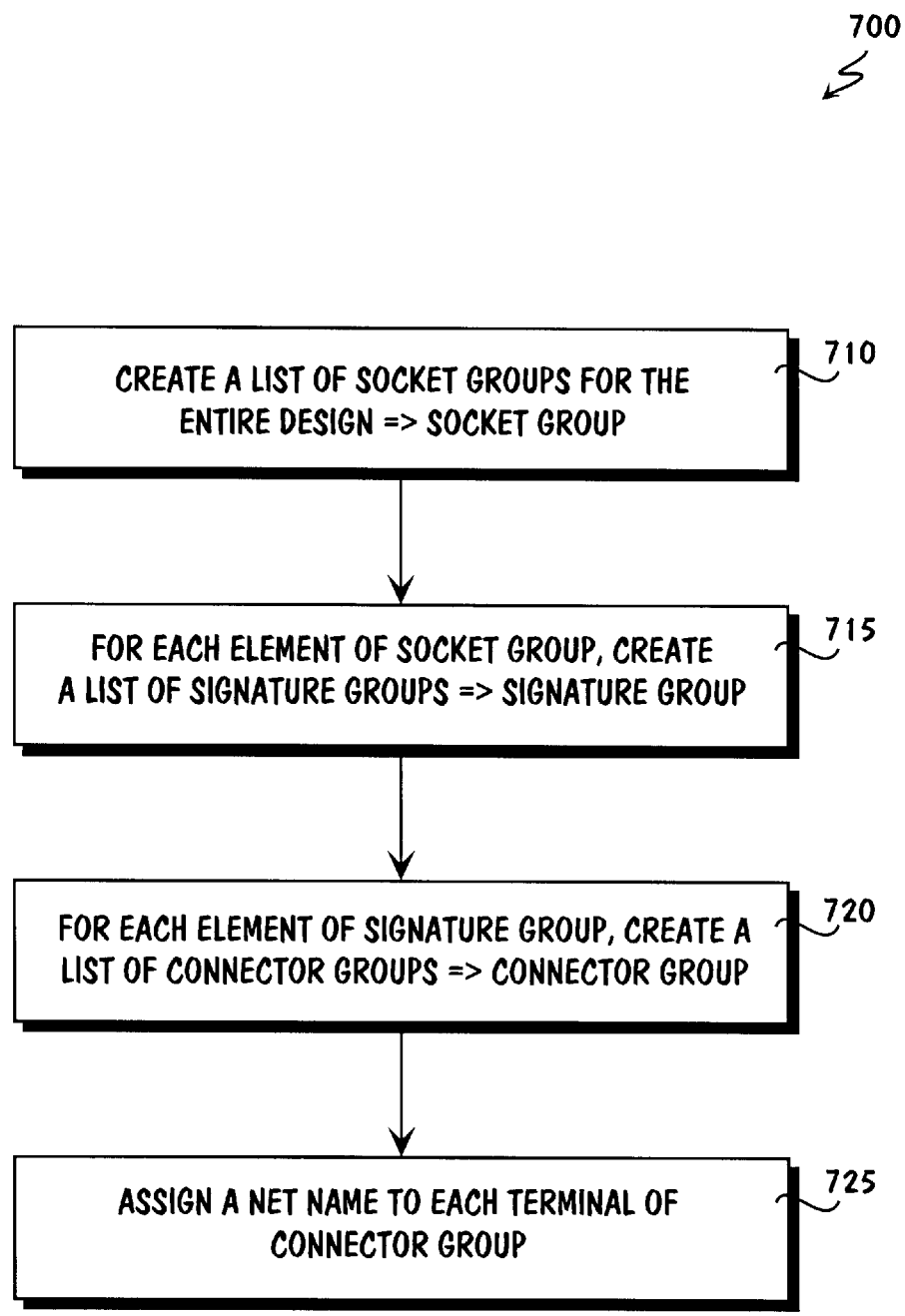
FIG. 7A illustrates an operational flow diagram of one embodiment of the netlist builder shown in FIG. 1.

FIG. 7A shows an operational flow diagram 700 which illustrates one embodiment of the netlist builder shown in FIG. 1. At processing block 710, netlist builder 125 operates to create a list of socket groups. In one embodiment, each socket group comprises a list of sockets derived from a common interface within the system. At processing block 715, netlist builder 125 creates a list of signature groups for each element within the previously created list of socket groups. In one embodiment, each signature group comprises a list of sockets having matching signatures. At processing block 720, netlist builder 125 creates a list of connector groups for each element within the previously created list of signature groups. In one embodiment, each connector group comprises a list of terminals having the same interface connector. At processing block 725, netlist builder 125 assigns a net name to each list of terminals having the same interface connector.

For example, consider the interrupt interface of the ABC system shown in Example 5, as it applies to the process described above with respect to FIG. 7A. When CIDL compiler 110 analyzes the interrupt interface, it detects a total of five sockets into the interface including four sockets (int1, int2, int3, and int4) within the myintctlr instance of the interrupt controller core and one socket (alarmint) within the mywatchdog instance of the watchdog core. CIDL compiler 110 processes each of these sockets in turn, looking for matches. In the ABC system, the int1 socket within the myintctlr instance of the interrupt controller core and the alarmint socket within the mywatchdog instance of the watchdog core, both have the signature parameter "priority" with a value of "1". Because the sockets have the same signature parameter values, CIDL compiler 110 will make a connection between the "level1" terminal on myintctlr and the "alarm" terminal on mywatchdog.

Additionally, the CIDL compiler 110 will analyze the custombus interface in the ABC system looking for connections. CIDL compiler 110 will detect a first mybus socket into the custom bus interface within the interrupt controller core, and a second mybus socket into the custom bus interface within the watchdog core. Because the two sockets have signature parameters that differ, no connection will be made between the sockets by CIDL compiler 110. Although once a connection is made between sockets, CIDL compiler 110 assigns a name to the newly formed net.

Figure 7B:
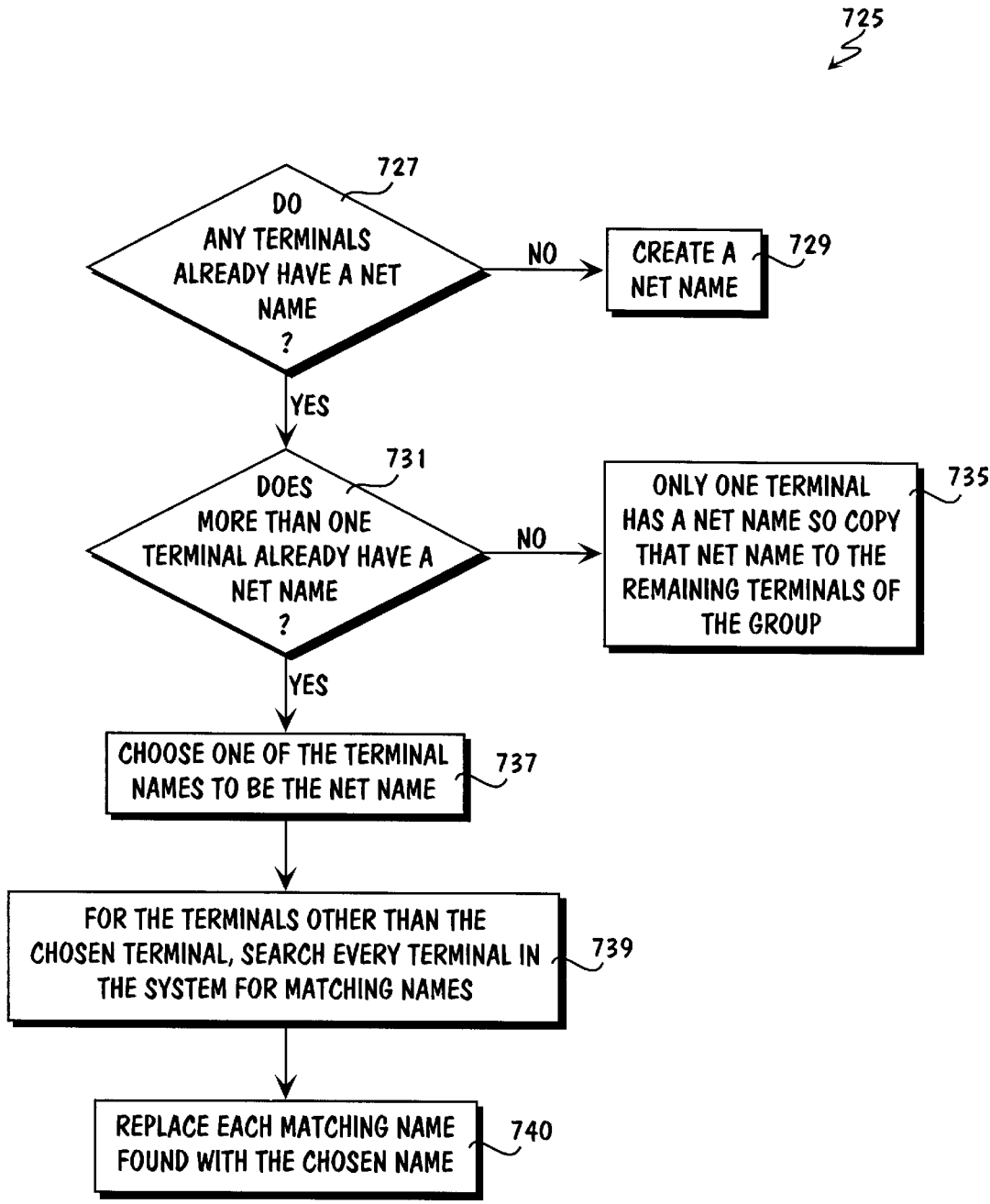
FIG. 7B is an operational flow diagram illustrating the net naming routine of FIG. 7A.

FIG. 7B is an operational flow diagram illustrating the net naming routine of processing block 725 of FIG. 7A. Referring to FIG. 7B, netlist builder 125 determines whether any core terminals have previously been assigned a net name at processing block 727. If none of the core terminals within a connector group have been previously assigned a net name, then netlist builder 125 creates a net name at processing block 729. At processing block 731, netlist builder 125 determines whether more than one core terminal of a given connector group has been previously assigned a net name. If only one terminal has been previously assigned a net name, netlist builder 125 copies that net name to the remaining terminals of the connector group at processing block 735. If, however, more than one core terminal within a giving connector group has previously been assigned a net name, netlist builder 125 proceeds by choosing one of the terminal names to be the net name for the connector group at processing block 737. At processing block 739, netlist builder 125 searches the remainder of the system for terminals having names that match each of the non-chosen terminal names of processing block 737. At processing block 740, netlist builder 125 substitutes the chosen name from processing block 737 for each matching name found by processing block 739.

Whereas many alterations and modifications of the present invention will no doubt become apparent to a person of ordinary skill in the art after having read the foregoing description, it is to be understood that any particular embodiment shown and described by way of illustration is no way intended to be considered limiting. Therefore, references to details of various embodiments are not intended to limit the scope of the claims which in themselves recite only those features regarded as essential to the invention.

What is claimed is:

1. A method of generating a system on a chip (SOC) design, the method comprising:
representing a first set of one or more terminals of a first core as a first socket having a first signature value;
representing a second set of one or more terminals of a second core as a second socket having a second signature value;
automatically associating the first socket with the second socket based at least in part on a relationship between the first and second signature values.

2. The method of claim 1, wherein the first signature value describes functionality of the first socket and the second signature value describes functionality of the second socket.

3. The method of claim 1, wherein associating the first socket with the second socket comprises generating at least one signal connection between the first set of one or more terminals of the first core and the second set of one or more terminals of the second core.

4. The method of claim 3, further comprising:
creating a netlist reflecting the at least one generated signal connection; and
outputting the netlist in a tool independent format.

5. The method of claim 4, further comprising converting the netlist into a tool specific format based upon received secondary design data.

6. The method of claim 3, wherein generating at least one signal connection further comprises:
identifying one or more socket groups designated within the design;
identifying one or more signature groups designated within each of the one or more socket groups;
identifying one or more connectors designated within each of the one or more signature groups; and
generating a connection between each of the one or more connectors designated within each of the one or more signature groups.

7. An article of manufacture comprising a machine readable medium having a plurality of machine readable instructions stored thereon, wherein when the instructions executed, the instructions cause a system to:
facilitate a first designer to represent a first set of one or more terminals of a first core as a first socket having a first signature value;
facilitate a second designer to represent a second set of one or more terminals of a second core as a second socket having a second signature value; and
automatically associate the first socket with the second socket based on at least a relationship between the first and second signature values.

8. The article of manufacture of claim 7, wherein the first signature value describes functionality of the first socket and the second signature value describes functionality of the second socket.

9. The article of manufacture of claim 7, wherein the machine readable instructions that cause the system to associate the first socket with the second socket further cause the system to generate at least one signal connection between the first set of one or more terminals of the first core and the second set of one or more terminals of the second core.

10. The article of manufacture of claim 9, further comprising machine readable instructions that cause the system to:

create a netlist reflecting the at least one generated signal connection; and output the netlist in a tool independent format.

11. The article of manufacture of claim 10, further comprising machine readable instructions that cause the system to convert the netlist into a tool specific format based upon received secondary design data.

12. The article of manufacture of claim 9, wherein the machine readable instructions that cause the system to generate at least one signal connection further cause the system to:

identify one or more socket groups designated within the design;

identify one or more signature groups designated within each of the one or more socket groups;

identify one or more connectors designated within each of the one or more signature groups; and generate a connection between each of the one or more connectors designated within each of the one or more signature groups.

13. An apparatus comprising:

a storage medium having stored thereon a plurality of machine executable programming instructions, wherein when executed, the programming instructions operate to:

facilitate a first designer to represent a first set of one or more terminals of a first core as a first socket having a first signature value, facilitate a second designer to represent a second set of one or more terminals of a second core as a second socket having a second signature value; and automatically associate the first socket with the second socket based on at least a relationship between the first and second signature values; and a processor coupled to the storage medium to execute the programming instructions.

14. The apparatus of claim 13, wherein the first signature value describes functionality of the first socket and the second signature value describes functionality of the second socket.

15. The apparatus of claim 13, wherein the machine executable programming instructions that operate to associate the first socket with the second socket further operate to generate at least one signal connection between the first set of one or more terminals of the first core and the second set of one or more terminals of the second core.

16. The apparatus of claim 15, further comprising machine executable programming instructions that operate to:

create a netlist reflecting the at least one generated signal connection; and output the netlist in a tool independent format.

17. The apparatus of claim 16, further comprising machine executable programming instructions that cause the system to convert the netlist into a tool specific format based upon received secondary design data.

18. The apparatus of claim 15, wherein the machine executable programming instructions that operate to generate at least one signal connection further cause the system to:

identify one or more socket groups designated within the design;

identify one or more signature groups designated within each of the one or more socket groups;

identify one or more connectors designated within each of the one or more signature groups; and generate a connection between each of the one or more connectors designated within each of the one or more signature groups.

* * * * *